United States Patent
Lee

(10) Patent No.: US 11,772,679 B2
(45) Date of Patent: Oct. 3, 2023

(54) STEER CONTROL LOGIC FOR EMERGENCY HANDLING OF AUTONOMOUS VEHICLES

(71) Applicants: Hyundai Motor Company, Seoul (KR); Kia Motors Corporation, Seoul (KR)

(72) Inventor: Jun Mo Lee, Aliso Viego, CA (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 342 days.

(21) Appl. No.: 16/999,875

(22) Filed: Aug. 21, 2020

(65) Prior Publication Data
US 2022/0055650 A1    Feb. 24, 2022

(51) Int. Cl.
| | | |
|---|---|---|
| *B60W 60/00* | (2020.01) | |
| *B60W 30/02* | (2012.01) | |
| *B60W 40/13* | (2012.01) | |
| *B60W 40/103* | (2012.01) | |
| *B60W 10/18* | (2012.01) | |
| *B60W 10/20* | (2006.01) | |
| *B60W 40/109* | (2012.01) | |

(Continued)

(52) U.S. Cl.
CPC .......... *B60W 60/001* (2020.02); *B60W 10/18* (2013.01); *B60W 10/20* (2013.01); *B60W 30/02* (2013.01); *B60W 40/103* (2013.01); *B60W 40/107* (2013.01); *B60W 40/109* (2013.01); *B60W 40/114* (2013.01); *B60W 40/13* (2013.01); *B60W 2040/1315* (2013.01); *B60W 2510/20* (2013.01)

(58) Field of Classification Search
CPC .... B60W 60/001; B60W 10/18; B60W 10/20; B60W 30/02; B60W 40/103; B60W 40/107; B60W 40/109; B60W 40/114; B60W 40/13; B60W 2040/1315; B60W 2510/20; B60W 40/105; B60W 2050/0005; B60W 2422/00; B60W 2520/10; B60W 2520/12; B60W 2520/14; B60W 2530/10; B60W 2540/18; B62D 6/005; B62D 15/025; B62D 6/003; B60Y 2400/81
USPC ................ 701/26, 41, 42; 180/234; 340/465
See application file for complete search history.

(56) References Cited

U.S. PATENT DOCUMENTS

| 5,524,079 A * | 6/1996 | Ishida .................... B62D 7/159 |
| | | 701/42 |
| 8,116,942 B2 * | 2/2012 | Yasui .................... B62D 6/003 |

(Continued)

FOREIGN PATENT DOCUMENTS

JP    4930007 B2 *  5/2012  ............. B62D 6/003

OTHER PUBLICATIONS

Mori, Kazunori, and Akari Itou. "Improvement in Maneuverability and Stability of Vehicle through Front/rear Active Steer Control with Steer-by-wire." (2010) (Year: 2010).*

*Primary Examiner* — Elaine Gort
*Assistant Examiner* — Ellis B. Ramirez
(74) *Attorney, Agent, or Firm* — Fox Rothschild LLP

(57) ABSTRACT

A method is provided for steering control of a vehicle by using lateral velocity of two know points (or lateral velocity of one known point and yaw rate), longitudinal velocity and steer angle information. These factors are used to calculate a target steer angle based on the track angle based on yaw decomposition to thus adjust a current steer angle of the vehicle based on the target steer angle.

10 Claims, 12 Drawing Sheets

(51) Int. Cl.
*B60W 40/107* (2012.01)
*B60W 40/114* (2012.01)

(56) References Cited

U.S. PATENT DOCUMENTS

| | | | |
|---|---|---|---|
| 9,561,803 B2* | 2/2017 | Markkula | B62D 6/005 |
| 2006/0235575 A1* | 10/2006 | Brown | B60W 40/101 |
| | | | 701/1 |
| 2008/0082246 A1* | 4/2008 | Brown | B60W 50/035 |
| 2008/0243335 A1* | 10/2008 | Rao | B60T 8/17554 |
| | | | 701/41 |
| 2018/0284769 A1* | 10/2018 | Wang | B62D 1/00 |
| 2020/0339135 A1* | 10/2020 | Kasaiezadeh Mahabadi | ............ |
| | | | B60W 30/045 |
| 2021/0403049 A1* | 12/2021 | Funke | B60W 50/045 |
| 2022/0144249 A1* | 5/2022 | Do | B60T 8/17551 |

\* cited by examiner

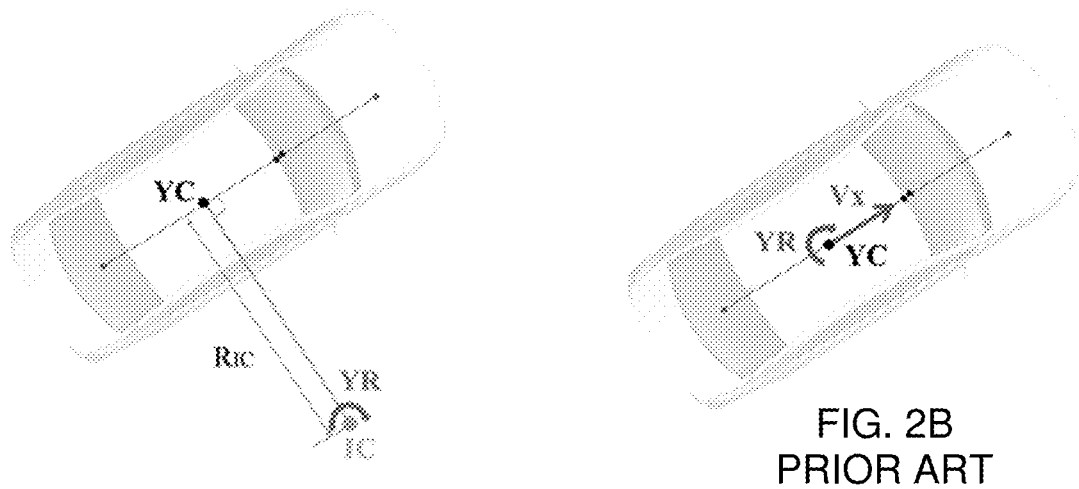
FIG. 2A PRIOR ART
FIG. 2B PRIOR ART
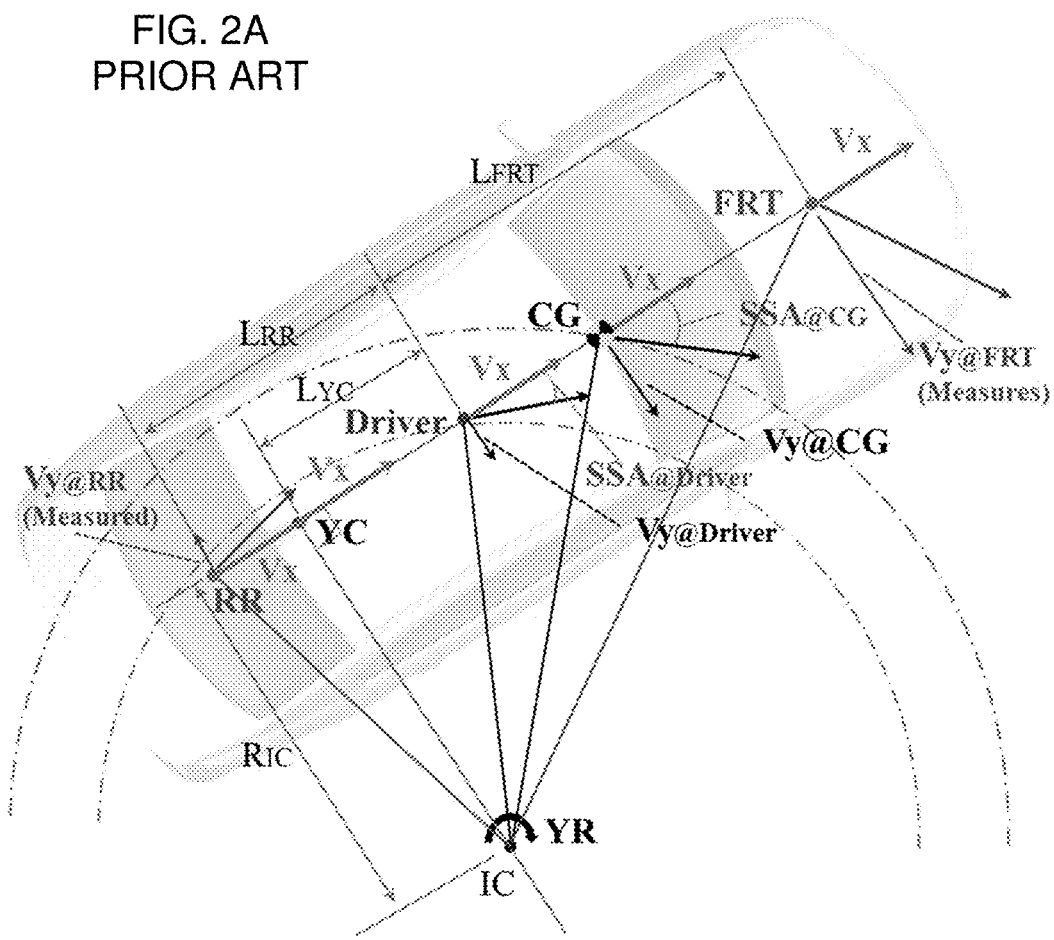
FIG. 2C PRIOR ART

STEER CONTROL LOGIC FOR EMERGENCY HANDLING OF AUTONOMOUS VEHICLES

FIELD OF THE DISCLOSURE

The present disclosure relates to a steer control method and, more specifically, to steer control in emergency situations to ensure vehicle stability.

BACKGROUND

In general, conventional transient motion analysis is used to evaluate characteristics of a moving vehicle, for example, during maneuvers of the vehicle. Using conventional transient motion analysis, vehicle cornering and feedback to a driver of the vehicle during cornering have been studied with reference to transient conditions. Specifically, analysis of planar motion of a vehicle has been studied with velocity information of two points on the vehicle at a given moment in time.

FIGS. 2A and 2B illustrate exemplary definitions related to vehicle planar motion at any given moment in time according to the prior art. In particular, FIG. 2A illustrates planar motion analysis of rotation of a vehicle about an instantaneous center (IC). The directions x, y and z may be defined as a vehicle motion direction (x), a side-to-side, lateral or vehicle width direction (y), and a vertical direction (z), where each of the x, y and z directions are perpendicular to each other and form a three-axis coordinate system. In FIGS. 2A and 2B, proceeding from a front of the vehicle (right side) to a rear of the vehicle (left side), the points along a centerline of the vehicle are a point aligned with a front axle of the vehicle (which may be identified as FRT), a center-of-gravity of the vehicle (which may be identified with the center-of-gravity symbol or with the acronym CG), a yaw center (YC) of the vehicle, and a point aligned with a rear axle of the vehicle (which may be identified as RR). Yaw rotation (YR) is a measurement of rotation about an axis (force over distance), which may be about the IC axis of a path of the vehicle (FIG. 2A) or about the YC of the vehicle itself (FIG. 2B). A radial distance ($R_{IC}$) is calculated from the YC to the IC, and, in this example, the $R_{IC}$ is perpendicular to a longitudinal axis of the vehicle in the x-direction at the YC.

FIG. 2B illustrates planar motion analysis of rotation of a vehicle about a yaw center (YC) and translation (e.g., Vx in the x direction). In particular, YR is shown about the YC axis, and the vector Vx represents forward velocity of the vehicle in the x-direction. Please note, the example of FIG. 2B demonstrates how vehicle motion may be interpreted only if there is information for one given moment of time and if the given moment occurs in a transient condition. This method does not work for vehicle motion in steady state cornering, in which the method according to FIG. 2C may be used. In any event, if it is not known whether a vehicle is in a steady state or a transient condition, and if there is information for one given moment of time, then there are various conventional methods for analysis of motion.

In analysis of vehicle plane motion, traditionally, yaw rate is considered the most representative and informative parameter to describe rotation (turning) of a vehicle on a plane, since vehicle rotation is described based on an assumption of a steady state during cornering. In steady state cornering, as illustrated in FIG. 2C of the prior art, yaw rate is representative of the vehicle's motion as the vehicle is actually rotating around a fixed point on the ground without a change of side slip angle. In FIG. 2C, the side slip angle (SSA) at each point on the vehicle body stays the same throughout the cornering with a constant radius and a constant angular velocity for as long as the vehicle maintains a steady state cornering condition.

FIG. 2C illustrates steady state cornering analysis of rotation of a vehicle about the IC according to prior art. The steady state analysis may include calculations, set forth as Equations (1)-(4), as follows:

$$Vy_{@FRT} - Vy_{@RR} = (L_{FRT} + L_{RR}) \cdot YR \quad (1)$$

$$YR = (Vy_{@FRT} - Vy_{@RR})/(L_{FRT} + L_{RR}) \quad (2)$$

$$Vx = R_{IC} \cdot YR \quad (3)$$

$$R_{IC} = Vx \cdot (L_{FRT} + L_{RR})/(Vy_{@FRT} - Vy_{@RR}) \quad (4)$$

That is, regarding Equation (1), with reference to FIG. 2C, a lateral velocity at a center of a front wheel axis (FRT) of the vehicle ($Vy_{@FRT}$) and a lateral velocity at a center of a rear wheel axis (RR) of the vehicle ($Vy_{@RR}$) are measured. A difference between $Vy_{@FRT}$ and $Vy_{@RR}$ is then calculated. A distance from FRT to a point representing a relative position of the driver along a longitudinal axis of the vehicle ($L_{FRT}$) and a distance from the driver to RR ($L_{RR}$) is calculated. In other words, the point labeled "Driver" (e.g., in FIG. 2C) is a point representing a center of the driver translated to a longitudinal axis through a centerline of the vehicle. The difference between $Vy_{@FRT}$ and $Vy_{@RR}$ may be equal to a sum of $L_{FRT}$ and $L_{RR}$, the sum then multiplied by yaw rotation (YR). In Equation (2), Equation (1) is solved for YR. In Equation (3), a forward velocity of the vehicle (Vx) is calculated as a product of $R_{IC}$ and YR. Equation (4) is solved for $R_{IC}$ using Equation (2) with YR based on Equation (3).

In FIG. 2C, a first radius has a center at IC and a circumference passing through the driver location, and a second radius has a center at IC and a circumference passing through the CG. The first and second radii demonstrate geometrically and physically determination of the side slip angle at a driver seating position and the CG point. The side slip angle of each point is the angle between a velocity vector and the longitudinal axis. The direction of velocity vector is parallel to a tangential vector of the point on the circumference where it meets each driver and CG point. As in FIG. 2A, the YC is calculated about the IC. The $R_{IC}$ is perpendicular to a longitudinal axis of the vehicle in the x-direction.

Additionally in FIG. 2C, five sets of vectors corresponding with total velocity, which includes a forward velocity (Vx) component and a lateral velocity (Vy) component, are shown at five corresponding points, i.e., RR, YC, Driver, CG, and FRT, respectively. The lateral velocity at RR ($Vy_{@RR}$) and the lateral velocity at FRT ($Vy_{@FRT}$) are measured. The lateral velocity at the Driver position ($Vy_{@Driver}$), the side slip angle at the Driver position ($SSA_{@Driver}$), the lateral velocity at CG ($Vy_{@CG}$), and the SSA at CG ($SSA_{@CG}$) are illustrated.

FIG. 2C demonstrates that, in steady state conditions, there is no yaw motion from yaw spinning around a yaw center, and that all the yaw motion is purely from path following, i.e., rotation around a fixed point, i.e., the instantaneous center (IC) of rotation on the ground at the rotation rate of YR. During steady state conditions, there is no change in side slip angle and turning radius. Additionally, the IC maintains a constant location as long as steady state conditions are maintained. Once the vehicle is out of steady state, the IC point will move. If one were to apply the above-referenced steady state cornering analysis method to transient motion analysis by using information from any one given moment in time, then such analysis would not provide information of a past history of the motion. That is, such analysis would not provide an ability to predict upcoming change of motion.

Further, conventional methods of transient motion analysis consider cornering of a vehicle based on steady state analysis or frequency domain analysis. For instance, steady state cornering analysis, by definition, lacks information over time. Accordingly, steady state cornering analysis is unable to detect a trend of change of vehicle motion over time. Therefore, using steady state cornering analysis, analysis of feedback to the driver of the vehicle during cornering is limited. For example, it is not possible to correlate steady state conditions to a driver's perception of a cornering maneuver, nor is it possible to predict upcoming vehicle motion change, i.e., the human aspects of the vehicle cornering experience are lost to conventional steady state analysis techniques. Similarly, with conventional frequency domain analysis, open loop testing and analysis are employed. However, due to the non-intuitive nature of open loop testing and analysis, determination of the driver's perception and predictive analysis are limited. The limitations of conventional methods are even more difficult in applications involving AV and SBW-equipped vehicles.

SUMMARY

The present disclosure provides a method of steer control for a vehicle. The method includes detecting, by a processor and/or a sensor, or by a processor using a sensor, a first lateral velocity of the vehicle at a first point of a body of the vehicle, a second lateral velocity of the vehicle at a second point of the body of the vehicle, a longitudinal velocity of the vehicle, and a current steer angle of the vehicle.

Additionally, the method includes calculating, by the processor, a yaw rate and a third lateral velocity at a reference point of the vehicle based on the first lateral velocity and the second lateral velocity, wherein the second lateral velocity is directly measured, or calculated based on the first lateral velocity and the yaw rate. Further, the method includes calculating, by the processor, the third lateral velocity at the reference point, a side slip angle and a yaw center location based on the yaw rate and the lateral velocity of the first point or based on the lateral velocities of the first and second points. Still further, the method includes calculating, by the processor, a side slip angle change based on the side slip angle and calculating, by the processor, a side slip angle rate portion of the third lateral velocity based on the side slip angle change and the yaw center location or a distance from the reference point to a yaw center.

The method further includes calculating, by the processor, a track angle rate portion of the third lateral velocity by subtracting the side slip angle rate portion of the third lateral velocity from the third lateral velocity. Still further, the method includes calculating, by the processor, a track angle by calculating an angle between the track angle rate portion of the third lateral velocity and the longitudinal velocity.

Additionally, the method includes calculating, by the processor, a target steer angle of the vehicle based on the track angle and a steer ratio of a steering wheel to a front road wheel to align the front road wheel parallel to a track angle velocity vector. Further, the method includes adjusting, by the processor, the current steer angle of the vehicle based on the target steer angle.

The first point of the body of the vehicle is a first point along a centerline of the vehicle aligned with a front axle of the vehicle, and the second point of the body of the vehicle is a second point along the centerline of the vehicle aligned with a rear axle of the vehicle. A first dual axis optical sensor is mounted proximate to a front axle of the vehicle, and a second dual axis optical sensor is mounted proximate to a rear axle of the vehicle. The reference point is a center of gravity of the vehicle.

The method further includes calculating, by the processor, that the side slip angle rate is equal to zero. Additionally, the method further includes operating, by the processor, a brake system of the vehicle to decelerate the vehicle in response to determining that the side slip angle rate is equal to zero.

Additionally, the present disclosure provides a system for steering control of a vehicle. The system includes a processor. Further, the system includes a first lateral velocity information of a first point of a body of the vehicle. Still further, the system includes a second lateral velocity information of a second point of the body of the vehicle or yaw rate information. The system also includes a longitudinal velocity sensor. Further, the system includes a current steer angle sensor.

The processor is configured to detect a first lateral velocity of the vehicle at a first point of a body of the vehicle, a second lateral velocity of the vehicle at a second point of the body of the vehicle, a longitudinal velocity of the vehicle from the longitudinal velocity sensor, and a current steer angle of the vehicle from a current steer angle sensor. Additionally, the processor is configured to calculate a yaw rate based on the first lateral velocity and the second lateral velocity or measure the yaw rate by a yaw rate sensor.

Further, the processor is configured to calculate the third lateral velocity at the reference point, a side slip angle and a yaw center location based on the yaw rate and the lateral velocity of the first point or based on the lateral velocities of the first and second points. Further, the processor is configured to calculate a side slip angle change based on the side slip angle and calculating, by the processor, a side slip angle rate portion of the third lateral velocity based on the side slip angle change and the yaw center location or based on the distance from the reference point to a yaw center.

Still further, the processor is configured to calculate a track angle rate portion of the third lateral velocity by subtracting the side slip angle rate portion of the third lateral velocity from the third lateral velocity. Still further, the processor is configured to calculate a track angle by calculating an angle between the track angle rate portion of the third lateral velocity and the longitudinal velocity. The processor is configured to calculate a target steer angle based on the track angle. Further, the processor is configured to adjust the current steer angle of the vehicle based on the target steer angle.

The first point of the body of the vehicle is a first point along a centerline of the vehicle, and the second point of the body of the vehicle is a second point along the centerline of the vehicle. A first dual axis optical sensor is mounted proximate to a front axle of the vehicle, and a second dual axis optical sensor is mounted proximate to a rear axle of the vehicle. The reference point is a center of gravity of the vehicle. The processor is further configured to determine that the side slip angle rate is equal to zero. Additionally, the processor is further configured to operate a brake system of the vehicle to control yaw stability of the vehicle in response to determining that the side slip angle rate is equal to zero.

Notably, the present invention is not limited to the combination of the elements as listed above and may be assembled in any combination of the elements as described herein. These and other capabilities of the disclosed subject matter will be more fully understood after a review of the following figures, detailed description, and claims.

BRIEF DESCRIPTION OF THE DRAWINGS

The exemplary embodiments herein may be better understood by referring to the following description in conjunction with the accompanying drawings in which like reference numerals indicate identically or functionally similar elements, of which:

FIG. 2A illustrates planar motion analysis of rotation of a vehicle about an instantaneous center (IC) according to prior art;

FIG. 2B illustrates planar motion analysis of rotation of a vehicle about a yaw center (YC) and translation according to prior art;

FIG. 2C illustrates steady state cornering analysis of rotation of a vehicle about the IC according to prior art;

Figure 1:
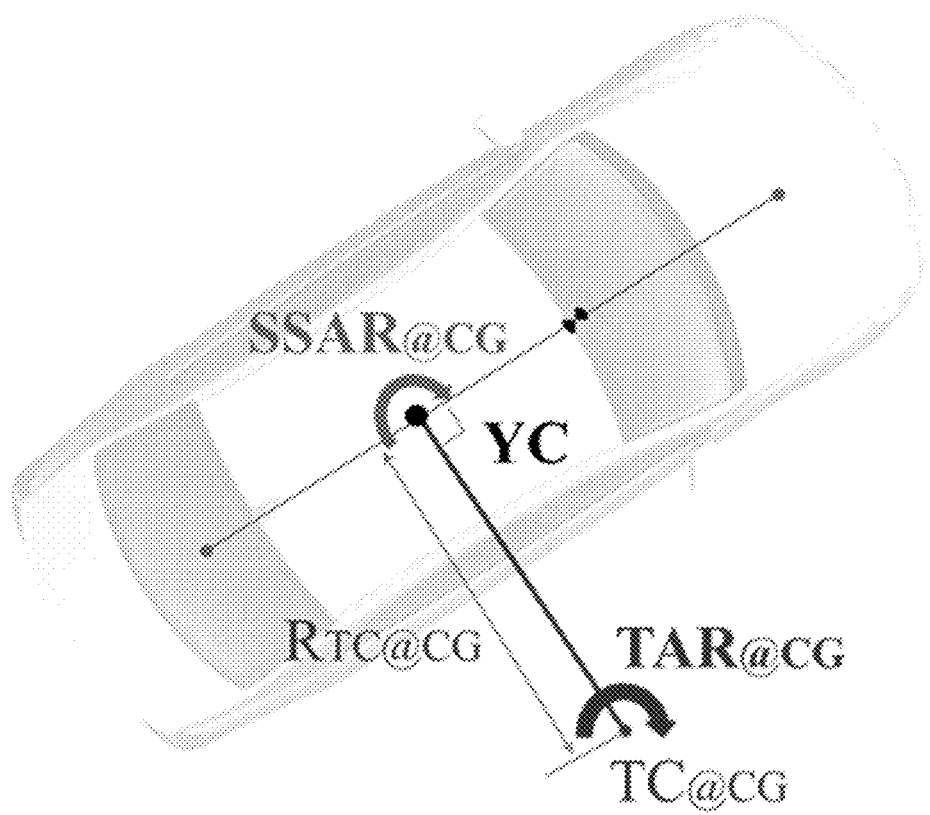
FIG. 1 illustrates planar motion analysis of rotation of a vehicle about the YC and rotation about a track center (TC) according to an exemplary embodiment of the present disclosure.

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium may also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third" and so on, herein, are provided to identify the operations, without describing the order of the operations, and the operations may be executed in a different order from the stated order unless a specific order is definitely specified in the context.

An improved transient motion analysis method is provided to overcome the limitations of traditional analysis methods, including steady state analysis and frequency domain analysis. The improved transient motion analysis method enhances quantification and qualification of motion of a vehicle, including, of particular interest, motion of the vehicle in a cornering maneuver.

Additionally, the improved transient motion analysis method considers a driver's feeling (or perception) during cornering relative to the quantified measurements of physical forces (feedback) transmitted to the driver. The present disclosure details improved methods of transient motion analysis and practical applications of the same. As a result, improvements in automotive development are achieved including improved steer control logic, particularly in emergency driving situations, improved limit handling during autonomous driving, improved limit handling for SBW-assisted driving, and improved vehicle stability regardless of the method of vehicle control and thus, provides overall driver safety.

Particularly, during cornering, feedback to the driver allows the driver to control the driving path and yaw motion of the vehicle, especially in emergency driving and limited handling situations. To improve cornering feedback, in-depth analysis of vehicle cornering motion is performed. Due to the transient characteristics of vehicle cornering motion, analysis of cornering feedback has heretofore been limited and challenging. In the present disclosure, properties of transient motion are compared to steady-state motion, and exemplary embodiments of a transient motion analysis method based on yaw motion decomposition is detailed. Analysis based on yaw decomposition permits separate analysis of vehicle motion, path following and yaw spinning, which are useful to improve transient motion analysis.

Steering input is important in emergency or limit handling driving conditions. A driver tends to steer a vehicle with inputs (e.g., adjustments of steering, operation of the accelerator, and braking) executed in a well-controlled and stable manner, which may be based on the driver's experience and assessment of various driving conditions, situations and vehicle responses to the same. However, in an autonomous vehicle (AV) or shift-by-wire (SBW) equipped vehicle and in some active steer control applications, due to the absence of the driver's steer inputs, initial targets for steer inputs are determined in advance to configure active steer control of the vehicle.

The development of improved steer control logic provides improved target steer inputs, which results in improved vehicle control, vehicle stability and path determination, particularly in emergency steering or limit handling situations. The targets may be used as steer input for an AV or for a SWB-equipped vehicle. The method of the present disclosure enhances a vehicle stability control system by providing improved feedback and driver inputs (including counter steer inputs), which may otherwise be relatively difficult for an unassisted human driver to achieve, particularly in adverse or emergency driving conditions.

In some exemplary embodiments, aligning front axle wheels parallel to a "pure" moving direction of a vehicle improves steer control and front axle lateral stability, because the alignment of the front axle wheels parallel to the pure moving direction of the vehicle minimizes incidence of lateral force on the front axle of the vehicle, which tends to resist achievement of the pure moving direction of the vehicle. Additionally, in some exemplary embodiments, for accurate calculation of the pure moving direction of the vehicle, yaw may be filtered out. A lateral velocity decomposition method may be used to filter out the yaw induced motion, which will also be referred to as side slip motion. Exemplary inputs include yaw rate, vehicle speed and lateral velocity.

A track angle may be calculated using the yaw rate, vehicle speed, and, in some exemplary embodiments, lateral velocity. Track angle, yaw rate, vehicle speed, and lateral velocity may be considered to calculate one or more of the following: (1) side slip angle, side slip angle rate (SSAR) and yaw center (YC) location using lateral velocity and yaw rate; (2) an SSAR portion of the lateral velocity using SSAR and YC location; (3) a track angle rate (TAR) portion of the lateral velocity by subtracting the SSAR portion of the lateral velocity from the lateral velocity; (4) track angle (TA) by calculating the angle between the TAR portion of the lateral velocity and longitudinal velocity (e.g., vehicle speed); and (5) a steer ratio of steer angle versus front axle wheels to calculate and apply a target (desired) steer angle to align and steer the front axle wheels parallel to the track angle.

In particular, Equations (5)-(7) may be used to executed the above calculations, as follows:

$$L_{YC} = Vy/YR \tag{5}$$

$$\text{Side Slip Angle (SSA)} = \text{Angle between } Vx \text{ versus } Vy \tag{6}$$

$$\text{Side Slip Angle Rate (SSAR)} = (-1) \cdot d(SSA)/dt \tag{7}$$

Regarding Equation (5), as viewed from above a vehicle, a distance from a center of a driver's position (e.g., a position on a longitudinal axis of the vehicle aligned with an actual seated position of the driver) to a yaw center (YC) of a vehicle ($L_{YC}$), may be determined by dividing a velocity of the vehicle in a lateral (side-to-side or vehicle width) direction (Vy) by a yaw rotation (YR) about an axis. In some embodiments, the axis may be an instantaneous center (IC) of the vehicle. Regarding Equation (6), a side slip angle (SSA) may be an angle between a velocity of the vehicle in a forward (vehicle length) direction (Vx) and Vy. Regarding Equation (7), a side slip angle rate (SSAR) may be a derivative of SSA over time.

Additionally, regarding Equation (7), the sign of SSAR is reversed to compensate for a reference coordinate difference. Normally, in vehicle dynamics, both of a local coordinate (with a vehicle body fixed) and global coordinates use the same directions. As an example, most commonly, both coordinates use right handed with forward as positive x, rightward as positive y and downward as positive z. In the case of side slip angle, as side slip angle is measured with respect to a vehicle fixed local coordinate while each of the track angle rate and the yaw rate is defined with respect to global coordinates, when TAR is calculated from YR and SSAR, the sign of SSAR is reversed to compensate for the reference coordinate difference.

Equations (8)-(10) are provided as follows:

$$Vy_{SSAR} = SSAR \times L_{YC} \tag{8}$$

$$Vy_{TAR} = Vy - Vy_{SSAR} = Vy - SSAR \times L_{YC} \tag{9}$$

$$\text{Track Angle (TA)} = \text{Angle between } Vx \text{ and } Vy_{TAR} \tag{10}$$

Further, a lateral velocity decomposition may be executed and a track angle may be calculated. A steering of front axle wheels may thus be adjusted to align to the track angle. In other words, in Equation (8), a velocity of the vehicle in the lateral direction taking into consideration the SSAR ($Vy_{SSAR}$) may be determined by multiplying SSAR by $L_{YC}$. In Equation (9), a velocity of the vehicle in the lateral direction taking into consideration the TAR ($Vy_{TAR}$) may be calculated by subtracting $Vy_{SSAR}$ from Vy, which is equal to Vy minus the product of SSAR and $L_{YC}$. In Equation (10), a track angle (TA) may be an angle between Vx and $Vy_{TAR}$.

The logic of the present disclosure may be applied to improve an initial steer target setting, particularly in emergency or limit handling conditions and in both of low and high mu (μ) driving conditions, which improves an active vehicle stability control system using the improved logic and initial steer target setting (in the present disclosure, mu or μ is an expression of split friction, i.e., a difference in friction between, e.g., left and right wheel paths).

In the present disclosure, in some exemplary embodiments, a pure moving direction or track angle of the vehicle is used as a target angle for the front axle wheels. The pure moving direction or track angle of the vehicle may be calculated by decomposing lateral velocity of the vehicle.

Hereinbelow, the descriptions of FIGS. 1 and 3-7, inclusive, provide an exemplary basis for an exemplary practical application represented by the descriptions of FIGS. 8A-8D, inclusive. Three methods provide an improved approach to understanding cornering feedback and application of cornering feedback, as follows: (1) transient motion analysis method based on yaw motion decomposed into (a) yaw from path following and (b) yaw from yaw spinning; (2) subjective versus objective correlation; and (3) application of vehicle motion control.

In particular, a transient condition includes both an input transient condition and an output transient condition. Input may be any type of input, either internal or external. For example, steer, throttle and brake may be considered internal inputs, or intended inputs, by a driver. Road disturbance or lateral wind are examples of external or unintended inputs. Output may be any type of vehicle response to a given input. Cornering situations may be categorized as follows: (1) a change in both input and output; (2) a change in input only (no vehicle response yet); and (3) a change in output only (input is completed, but the vehicle is still responding). Situation (1), i.e., a change in both input and output, is the most common transient condition of cornering as the driver is continuously adjusting driver input based on the feedback during cornering.

Figure 7:
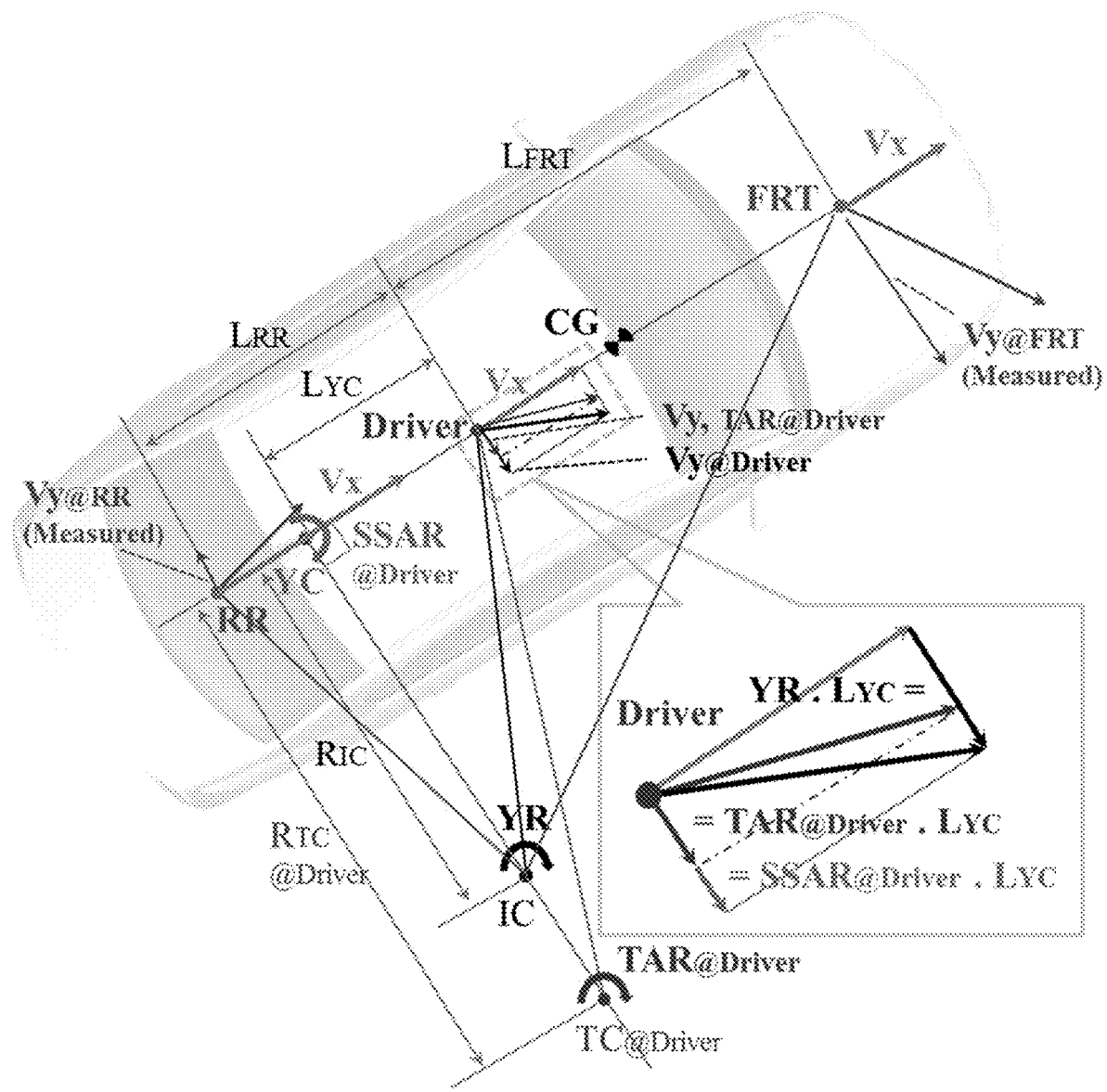
FIG. 7 illustrates transient cornering with combined rotation about the TC and YC including TAR and SSAR according to an exemplary embodiment of the present disclosure.
Figure 8A:
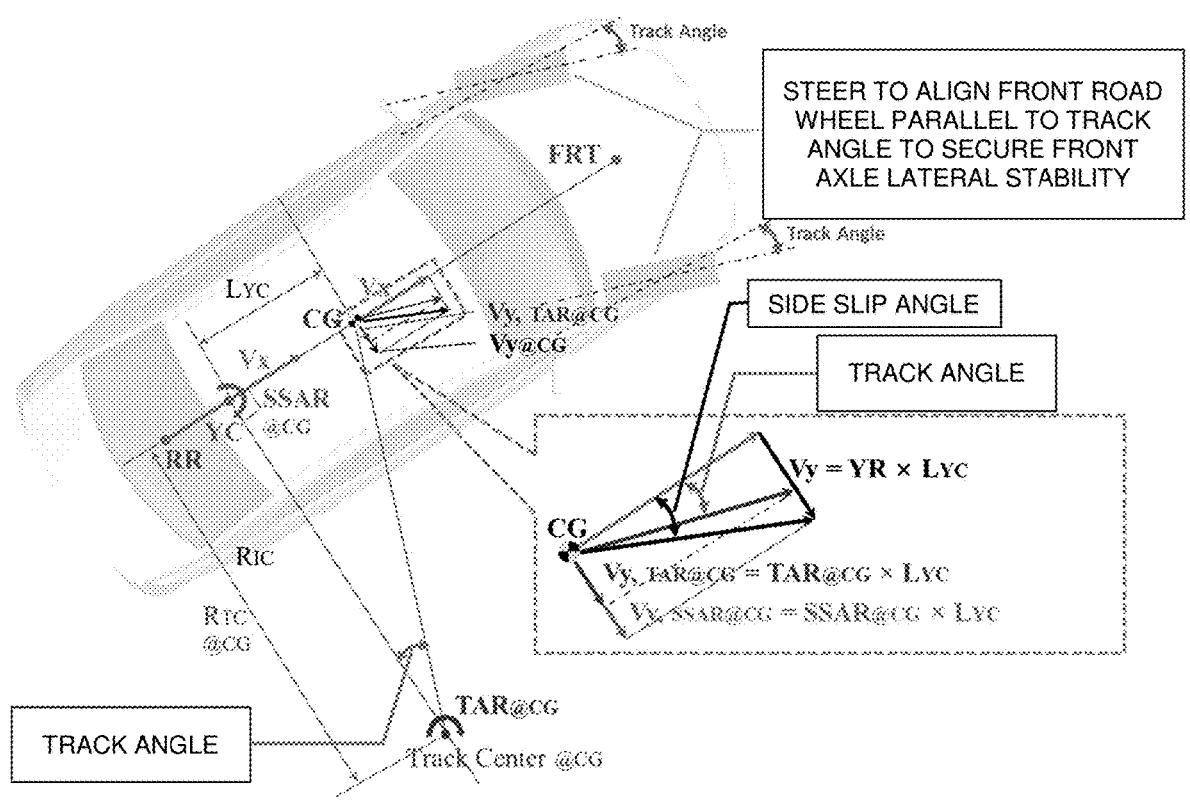
FIG. 8A illustrates a vehicle motion control application to an emergency handling control situation, in which front wheels are aligned to a track angle to improve front axle lateral stability, according to an exemplary embodiment of the present disclosure.

FIG. 1 illustrates planar motion analysis of rotation of a vehicle about the YC and rotation of the vehicle about a track center (TC) according to an exemplary embodiment of the present disclosure. In FIG. 8A, a side slip angle rate of the center of gravity ($SSAR_{@CG}$) is rotation rate of the vehicle around the YC. A track angle rate of the center of gravity ($TAR_{@CG}$) is rotation of the vehicle about the $TC_{@CG}$. The track center ($TC_{@CG}$) is a center of a circle defined by movement of the CG point of the vehicle. A distance between the $TC_{@CG}$ and YC is expressed as $R_{TC@CG}$. Notably, the subscript "CG" indicates that the analysis/calculation is based on the CG point as an analysis reference point. As an example, in FIG. 7, as a driver seating point is used as an analysis reference point, all of SSAR, TAR and TC have "driver" as a subscript. SSAR, TAR and TC are all dependent on the analysis reference point. On the contrary, YR and IC are independent to this reference point; thus, no subscript is used for YR or IC.

The variables $SSAR_{@CG}$, $R_{TC@CG}$, $TAR_{@CG}$ and $TC_{@CG}$ as shown in FIG. 1 may be used for analysis of transient motion. Transient motion analysis may include time history information of vehicle motion, which may improve accuracy of analysis of a driver's accumulated feeling over a certain period of time. In contrast, the information presented in FIGS. 2A and 2B of the prior art does not include time history information of vehicle motion. The information presented in FIGS. 2A and 2B may be used for steady state condition analysis. The information presented in FIGS. 2A and 2B is not suitable for the transient motion analysis of the present disclosure.

Specifically, FIG. 1 illustrates properties of planar and transient motion analysis. Cornering motion is not pure rotation around one point. Rather, in many cases, unless a vehicle is in a steady state cornering condition (e.g., a vehicle traveling slowly may undergo steady state conditions or near steady state conditions), cornering motion is only accurately expressed and analyzed if cornering motion is measured and analyzed as a combination of two types of rotation. In some exemplary embodiments, as illustrated for example in FIG. 1, based on a cornering analysis method, which includes path following and yaw spin, vehicle transient motion is decomposed into two rotations, i.e., (1) track angle rate rotation (e.g., $TAR_{@CG}$ in FIG. 1) around track center on the ground (e.g., $TC_{@CG}$ in FIG. 1); and (2) side slip angle rate rotation (e.g., $SSAR_{@CG}$ in FIG. 1) around yaw center (YC) of the vehicle.

Terms used to define a cornering feeling or cornering feedback are relatively subjective. A wide variety of terminologies are used to describe the cornering feeling, and a wide variety of preferences exist from one driver to the next. In the present disclosure, subjective feedback of the driver to describe a feeling during cornering was obtained for three different sporty or high-performance vehicles. The subjective cornering feelings were correlated to objective test results. Types of cornering feedback used for the present correlation include the following: (1) Carving Feeling; (2) Path Precision; (3) Turn-In Response; (4) Playfulness; and (5) Predictability.

As used herein, transient analysis is limited to transient motion analysis, which does not include transient cornering dynamics analysis. Cornering dynamic analysis is helpful in understanding input versus output relationships and to improve actual dynamics of a vehicle. However, to objectively quantify a driver's feeling of cornering feedback, transient motion analysis may be based on the following: (1) yaw rate decomposition, and (2) a subjective versus objective correlation. One feature of cornering feedback is quantification and qualification of motion of the vehicle, which is perceived by the driver over a certain period of time. To analyze cornering feedback in a transient condition, (1) time history and (2) a reference point are determined.

(1) Time History Information of Vehicle Motion: For transient motion analysis, vehicle motion information at any one given moment in time (steady state information) is insufficient to provide further information of how the vehicle has moved in the past, the current status of the vehicle, and how the vehicle will move next. Information regarding previous time history of motion may be measured to analyze a trend of the motion, which the driver has been experiencing over time, and to predict subsequent motion, which may be anticipated by the driver based on the accumulated feedback.

(2) Reference Point (Analysis Point): Since velocity information used for motion analysis is dependent on a particular location or point of interest, selection of a reference point (or analysis point) improves analysis of driver feeling through vehicle cornering. In the present disclosure, driver seating position (relative to the longitudinal axis of the vehicle, e.g., the point labeled "Driver" in FIGS. 7A and 7B) may be used as a reference point or analysis point in FIG. 7 for the purpose of driver feeling correlation purposes and CG point is used as a reference point or analysis point in FIG. 8 for the purpose of calculation of pure moving direction of the vehicle.

In the transient condition, vehicle yaw motion is the combined result of several yaw motions from different sources. (1) Rotation from path following is the most dominant source of yaw motion, which is rotation around a center of a track (or path) at a given moment in time. (2) Rotation from yaw spinning is the next most dominant source of yaw motion, but rotation from yaw spinning may be considered relatively small, except for high spinning situations like an extreme oversteer condition. Yaw motion is rotation (YR) around a yaw center (YC) and measured as a change in side slip angle (SSA). (3) Yaw motion induced from inclination of a roll axis of a vehicle is relatively small even compared to rotation from yaw spinning; therefore, yaw motion induced from inclination of a roll axis is not further considered in the present disclosure.

As explained above, for transition analysis, additional information is obtained and determined including a determination of a contribution to rotation from path following and a contribution to rotation from yaw spinning. The additional information may be used to predict a future event and to better quantify a cornering feeling in a transient condition.

Figure 3:
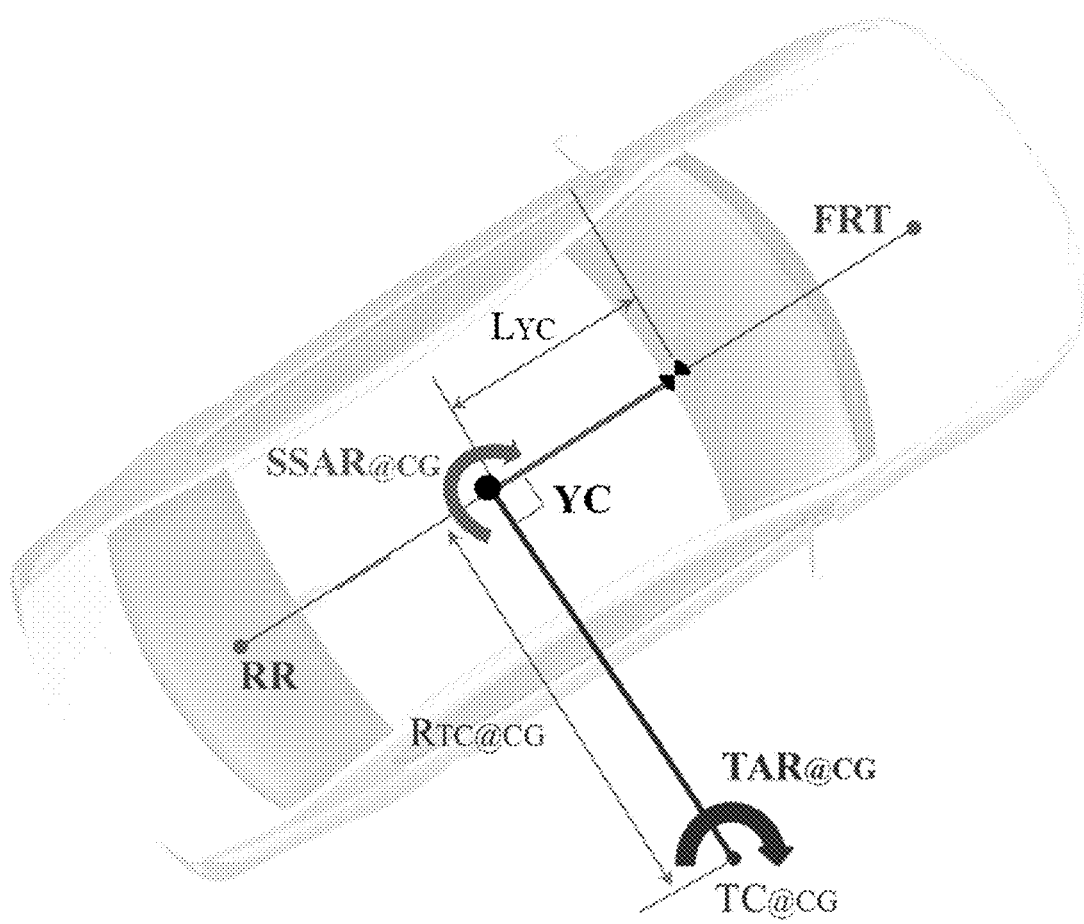
FIG. 3 illustrates yaw rate decomposition analysis—including track angle, side slip angle, and their rates of change, i.e., track angle rate (TAR), and side slip angle rate (SSAR)—of transient cornering motion of a vehicle about the TC according to an exemplary embodiment of the present disclosure.

FIG. 3 illustrates an exemplary decomposition of yaw motion for analysis of transient motion according to some exemplary embodiments of the present disclosure. Yaw motion may be decomposed into two components, yaw motion from path following and rotation around yaw center.

Yaw motion from path following is rotation around a track center (TC) at any given moment of time at a track angle rate (TAR) of rotation. The TC is on a line, which is perpendicular to a longitudinal axis of the vehicle at the yaw center (YC). TC is like IC, but TC may be at a different location unless the vehicle is in a steady state condition. In the steady state condition, due to the absence of side slip angle rate (SSAR), track angle rate (TAR) equals yaw rate (YR), and both TC and IC are at the same location. In contrast, in transient condition, rotation about yaw center is rotation around YC taking into consideration the side slip angle rate (SSAR).

FIG. 3 illustrates yaw rate decomposition analysis—including track angle, side slip angle, and their rates of change, i.e., track angle rate (TAR) rotation about TC and side slip angle rate (SSAR) rotation about YC—of transient cornering motion of a vehicle according to an exemplary embodiment of the present disclosure. In FIG. 3, TA, SSA and their rates of change, TAR and SSAR, are presented with respect to CG point. If this reference point is changed, then the value of TA and SSA will change for the same vehicle motion at the same given moment in time. This characteristic is part of a cornering feel analysis, which is explained in more detail. In contrast, for a driver feeling analysis and correlation, a driver seating position may be used as the analysis point.

In cornering, as detailed above, yaw motion of a vehicle is mainly induced from path following and, to a lesser extent, from yaw spinning about the yaw center. Additionally, while a yaw rate value is the same regardless of any particular reference point on the vehicle body, each of the yaw motion from path following and the yaw motion from yaw spinning is dependent on the reference (or analysis) point. Once a reference point is selected, a position of the reference point may be measured, and a trajectory of the reference point may be plotted. Track angle may be an indicator of a moving direction of a reference point at a given moment in time.

Figure 4:
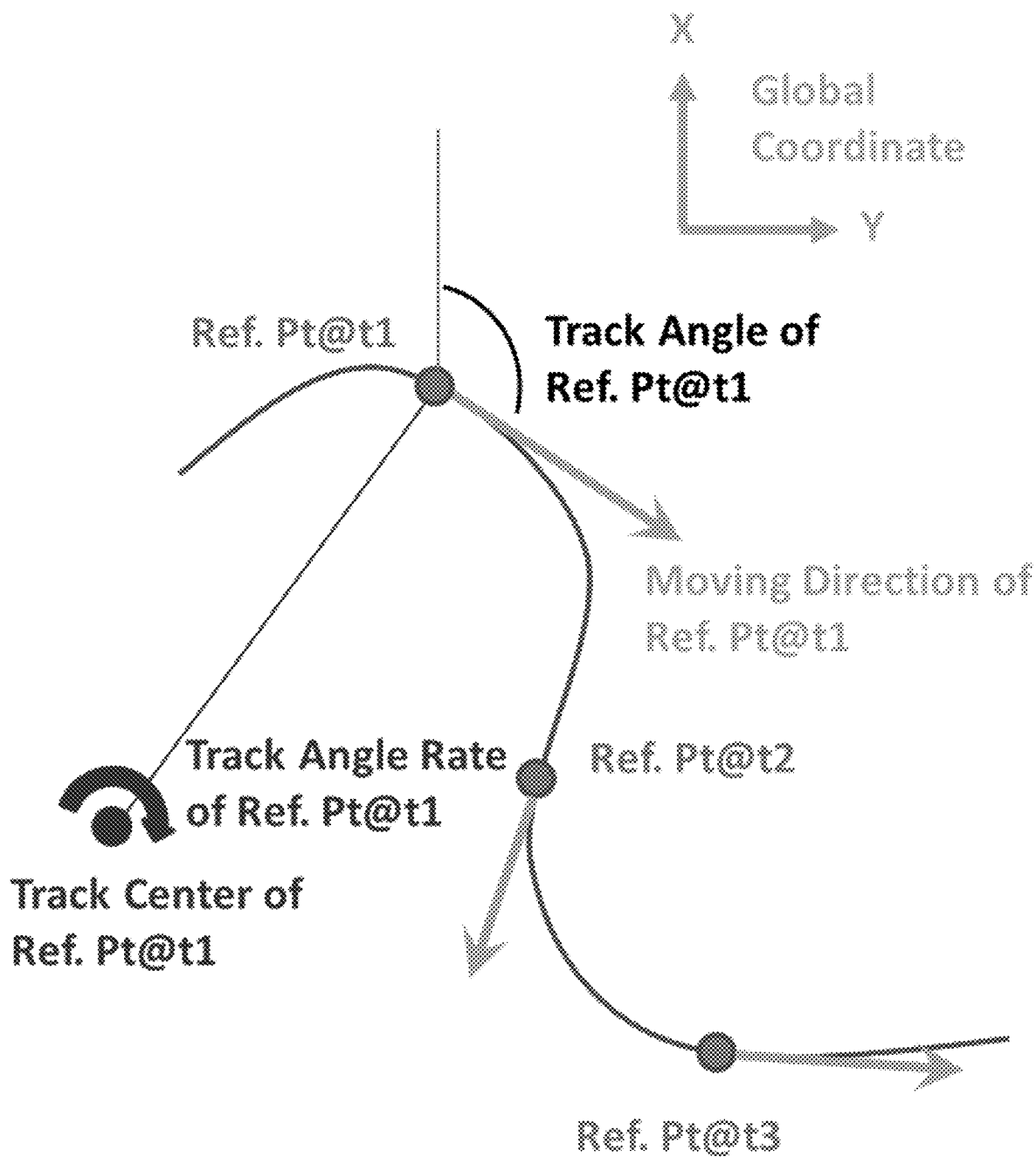
FIG. 4 illustrates track angle and track center analysis according to an exemplary embodiment of the present disclosure.

FIG. 4 illustrates a moving direction of a reference point of a vehicle and a measured angle of the moving direction with respect to global coordinates (i.e., global coordinates are different from the directions x, y and z noted above relating to directions of motion of the vehicle). FIG. 4 illustrates track angle and track center analysis according to an exemplary embodiment of the present disclosure. In FIG. 4, the measured angle is the track angle. The track is a trajectory of a given reference point of the vehicle body. The track as depicted in FIG. 4 does not contain any information about an orientation of a body of a vehicle.

In most examples of transient motion (as opposed to steady state motion), a center of the track (or path) is not fixed and a shape of the track (or path) is not a complete circle. Rather, the center of the track at any given point along the track is assumed. The track center (TC) migrates during cornering unless the vehicle is in a steady state. Track angle rate (TAR) is a rate of change of the track angle (TA), and TAR may be calculated with a time derivative of the track angle (TA). However, in reality, unless a position on the vehicle is used as a reference point and a movement of the reference point are very accurately measured, it is relatively difficult to directly measure TA and calculate the time derivative of the TA. Therefore, a calculation method of TAR using lateral velocity and yaw rate information is provided.

For example, at time t1, a reference point on a vehicle may be established, and a track angle (TA) with respect to a track center (TC) of the reference point at t1 may be determined. The track angle rate (TAR) at the TC at time t1 may be determined and a moving direction of the reference point at time t1 may be determined. This process of determining TA, TC, TAR and moving direction for the reference point may continue through time, e.g., at time t2, t3, and so on.

Figure 5:
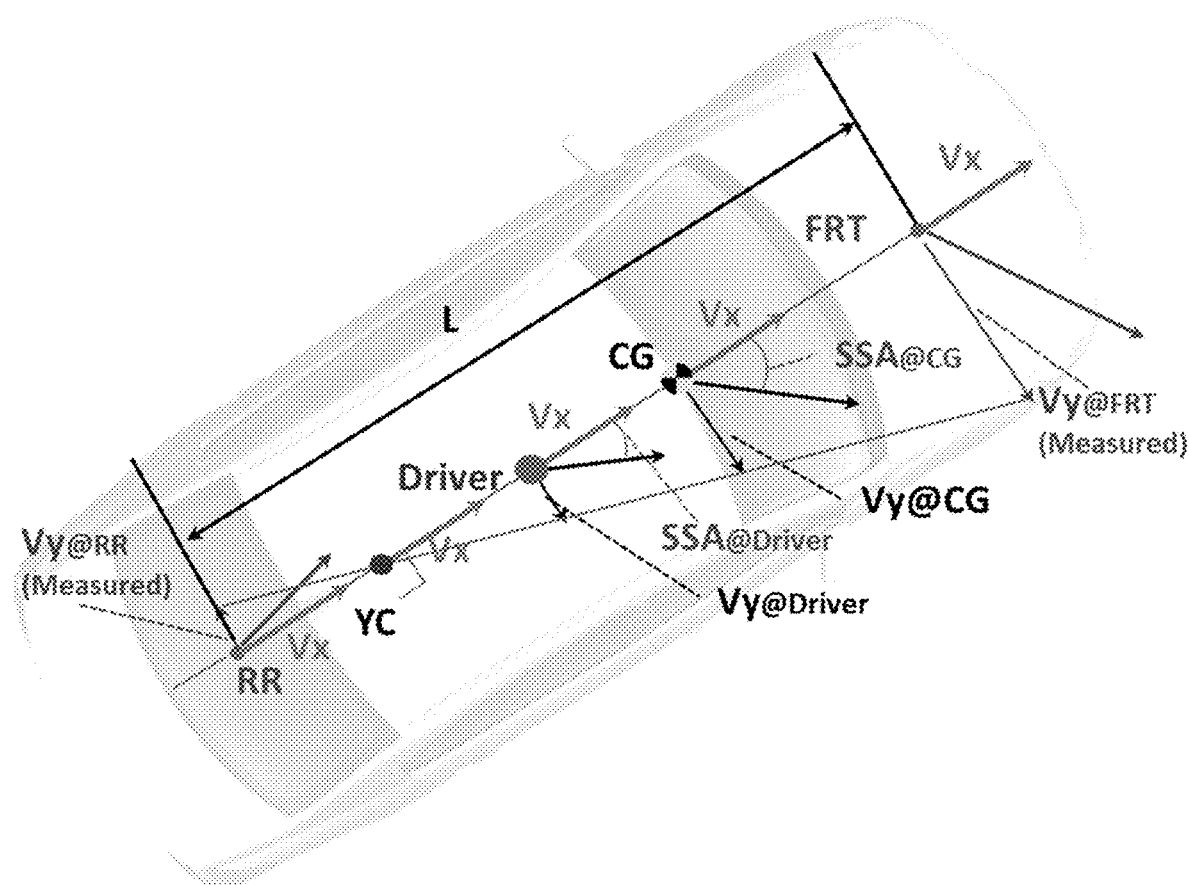
FIG. 5 illustrates determination of side slip from lateral velocity according to an exemplary embodiment of the present disclosure.

Determination of side slip angle (SSA) of a vehicle is part of an analysis of vehicle motion according to the present disclosure. SSA is useful when the vehicle is in a transient condition and may be an indicator of how much side-to-side or lateral motion the vehicle is experiencing during cornering, and, in some situations, during pure (forward) translating motion. Similar to TA, SSA is dependent on a reference point (or analysis point). FIG. 5 illustrates side slip analysis determined from lateral velocity according to an exemplary embodiment of the present disclosure.

As shown in FIG. 5, SSA may be calculated from a measured lateral velocity (Vy) of a reference point, here, for example, lateral velocity may be measured at the rear axle ($Vy_{@RR}$) or at the front axle ($Vy_{@FRT}$). If lateral velocity is measured at a location not matching a reference point of interest, then the lateral velocity at the reference point may be calculated as illustrated in FIG. 5 by measuring yaw rate (YR) information. The yaw center (YC) may be determined by determining a point along a longitudinal axis of a vehicle where lateral velocity is zero at any given moment in time (i.e., there is no lateral velocity (Vy) vector illustrated at yaw center (YC); whereas, lateral velocity is shown at RR, Driver, CG and FRT). The YC migrates as vehicle motion changes. A time derivative of SSA may be calculated to determine SSAR. The SSA and SSAR may be used to determine a trend of SSA and a trend of yaw spin over time.

Figure 6A:
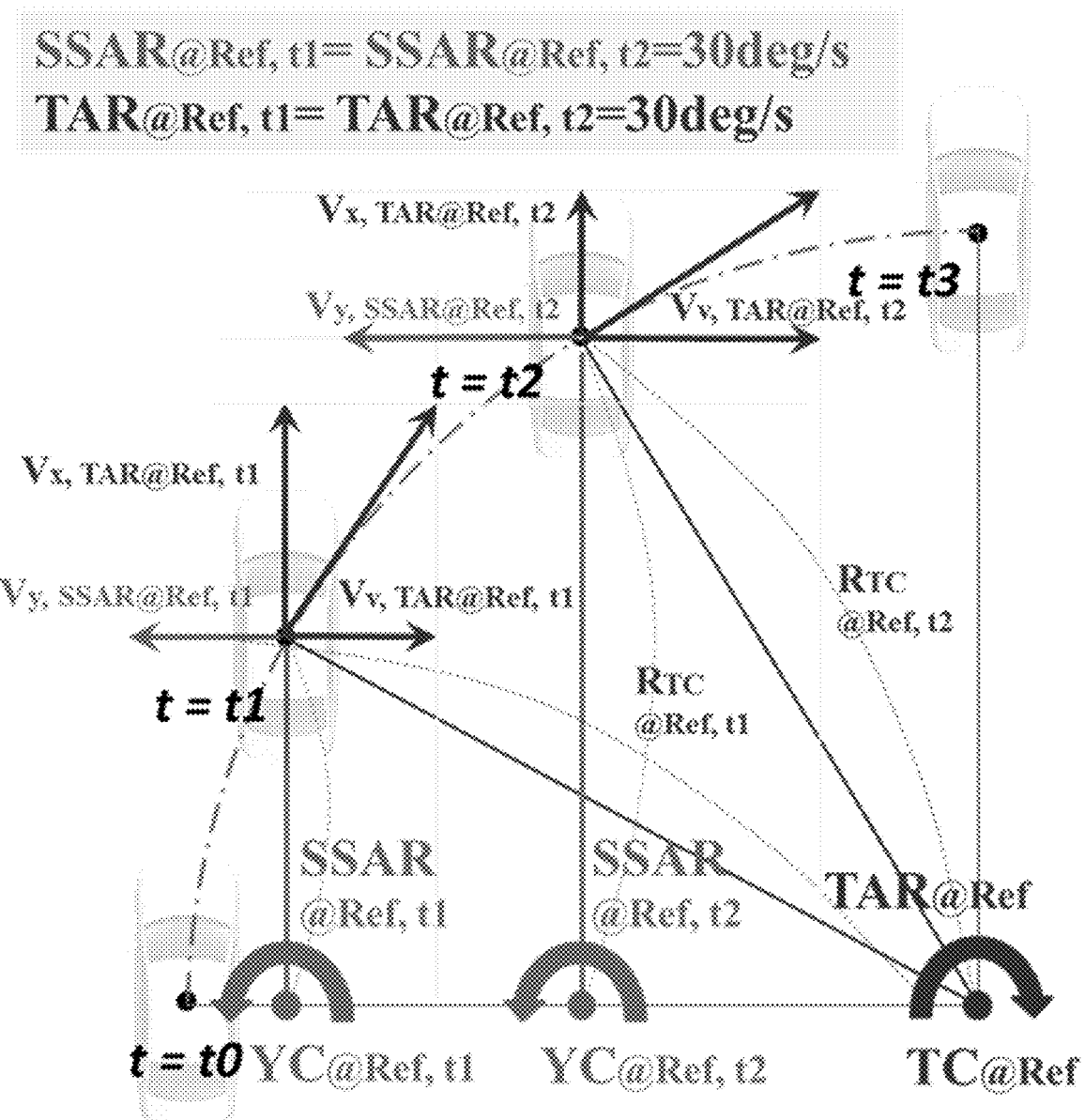
FIG. 6A illustrates side slip analysis including side slip angle rate of change (SSAR) versus track angle rate of change (TAR) and time history information contained by the side slip angle rate according to an exemplary embodiment of the present disclosure.
Figure 6B:
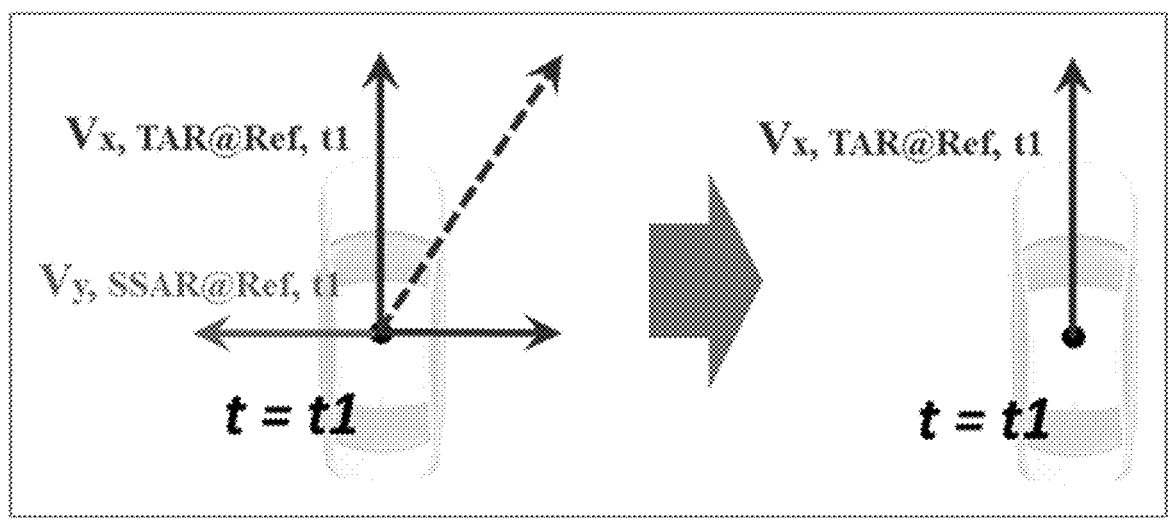
FIG. 6B illustrates velocity analysis in terms of TAR and SSAR for the side slip analysis of FIG. 6A according to an exemplary embodiment of the present disclosure.

A positive and negative sign convention flip and time history information are demonstrated, for example, in FIGS. 6A and 6B. FIG. 6A illustrates side slip analysis including side slip angle change versus track angle change and time history information contained by the side slip angle rate according to an exemplary embodiment of the present disclosure. FIG. 6B (left side) illustrates velocity analysis in terms of TAR and SSAR for the side slip analysis of FIG. 6A at time=t1 according to an exemplary embodiment of the present disclosure. In addition, FIG. 6B (right side) illustrates velocity analysis in terms of TAR for the side slip analysis of FIG. 6A at time=t1 according to an exemplary embodiment of the present disclosure. FIGS. 6A and 6B illustrate the following: (1) how side slip angle change relates to track angle change, and (2) why time history information represented by SSAR is useful.

Regarding the sign convention flip, a vehicle may be assumed to rotate around a fixed track center at a rotation rate of about 30 deg/s and to rotate around a yaw center at the same rate of about 30 deg/s, but the present disclosure is not limited thereto. If TAR and SSAR are calculated and if both global and local coordinates follow the same sign convention (e.g., positive x is forward and positive y is rightward), then both TAR and SSAR, at time t1, for example, at a given reference point will be positive (+) 30 deg/s. However, as shown, for example, in FIG. 6A, an actual rotation of a vehicle about a track center is in a positive (+) yaw direction (clockwise) while actual rotation about a yaw center is in a negative (−) yaw direction (counterclockwise). Accordingly, a sign convention flip is used for SSAR for transient motion analysis. In other words, other parameters may be calculated with respect to global coordinates, while SSA is calculated with respect to fixed local coordinates of a vehicle body.

Regarding time history information, if status information of a vehicle is assumed to be at only one given moment of time, t1, then only longitudinal velocity may be determined. Lateral velocity and yaw rate are unable to be determined with information from only one point in time. With this limited information, only a pure forward motion or a straight driving condition may be determined. However, if additional vehicle status information is collected including, for example, SSAR, TAR, and TC location, then vehicle motion at a current time (instantaneous vehicle motion) may be better quantified and understood, and, as a result, accuracy of prediction of how the vehicle motion may change over time in the future may be improved.

Additionally, side slip angle may demonstrate whether a vehicle's yaw spin motion around yaw center is complying or resisting path following. Side slip compliance or side slip resistance, facilitates overall analysis of side slip motion, since the side slip compliance or side slip resistance information may be compared and correlated to a driver's feeling of turn-in response (or resistance) of the vehicle. For example, in front axle steered vehicles, a driver generally feels side slip resistance in the beginning of a turn, since the yaw center (YC) is located at the rear axle (RR) in the beginning of a turn.

If there is excessive side slip resistance in an initial stage of turn-in, even with a high level of vehicle path turning response and gain, a driver may feel initial turn-in resistance. This situation is due to a change in the vehicle heading angle (or rotation attitude). Additionally, excessive side slip resistance and initial turn-in resistance may degrade a positive cornering feeling for the driver. Accordingly, merely analyzing yaw rate and lateral acceleration may not adequately predict or correlate with a driver's feeling of turn-in response, unless the effect of side slip resistance is specifically determined in the manner described above. Otherwise, the driver's feeling of turn-in response may be less perceptible due to the driver's perception of total yaw rate. Therefore, for improved analysis of driver feeling, vehicle motion in terms of path-following and yaw spinning is separately analyzed with a driver seating position as a reference point.

Accurate, direct measurement of an actual path with respect to a reference point is difficult with conventional methods; therefore, a method of using lateral velocity to calculate track angle is provided. Lateral velocity may be obtained with direct measurement using a lateral velocity sensor, by calculating or estimating the lateral velocity based on indirect measurements, or any other suitable means. For accurate measurement of side slip (or lateral velocity) of a vehicle, two dual axis optical sensors mounted in the front and rear of test vehicles may be used. Each sensor may be configured to measure both longitudinal and lateral velocity without signal drifting, which is an advantage over a global positioning system (GPS)-based inertial measurement unit (IMU) sensor.

With velocity information measured at two known points of a vehicle body, yaw rate and lateral velocity at any reference point on the vehicle body may be calculated. Once side slip angle (SSA) and yaw rate (YR) are calculated, side slip angle rate (SSAR) may be calculated as a time derivative of side slip angle (SSA). Once SSAR is calculated, track angle rate (TAR) may be derived (see, also, FIG. 7). FIG. 7 illustrates transient cornering with combined rotation about the TC and YC at a rotation rate of TAR and SSAR according to an exemplary embodiment of the present disclosure. In particular, FIG. 7 includes a detailed view of a driver's forward velocity (Vx), yaw rotation (YR), TAR and SSAR according to an exemplary embodiment of the present disclosure. TAR may be derived as shown in Equation (11), as follows:

$$\text{Yaw Rate (YR)} = \text{Track Angle Rate (TAR)} + \text{Side Slip Angle Rate (SSAR)} \quad (11)$$

In Equation (11), the sign convention of SSAR is flipped before the derivation to convert the SSAR value with respect to global coordinates. SSAR is the rotation rate around yaw center (YC) (e.g., a point on a longitudinal axis of a vehicle at a fixed coordinate where the lateral velocity with respect to the vehicle at the fixed coordinate is zero), and the rotation around YC does not create longitudinal velocity at any point on the vehicle body as long as any point on the vehicle body is on the longitudinal axis. SSAR contributes a limited portion of overall lateral velocity. On the contrary, rotation around a track center at a rotation rate of the track angle rate contributes a majority of overall lateral velocity and is the sole source of longitudinal velocity.

In FIG. 7, lateral velocity components are illustrated in detail and explained herein. In this example, both the rotation around the track center and the rotation around the yaw center are working in the same direction (clockwise, as shown). In other words, the track angle rate is less than the total yaw rate, and the difference is made up by the side slip angle rate. Using this method, the track angle rate may be calculated and the track center may be located without measuring an actual path at a given reference point.

Additionally, in FIG. 7, TC is located farther from the vehicle than IC. As both longitudinal velocities from rotation around IC and from rotation around TC are supposed to be the same, i.e., when TC is located farther than IC, the track angle rate is smaller than a total yaw rate. Comparing the relative locations of TC and IC is another method to quantify and analyze motion in terms of side slip angle as resisting or complying with path following (path turning). Notably, the TC and TAR may be calculated based on a driver seating position (e.g., along the longitudinal axis of the vehicle) as a reference point. If the reference point is changed, then the TC location and TAR will also change due to dependency of track angle and side slip angle on the reference point. For the sake of comparison, in FIG. 1 and in FIG. 3, side slip angle change is in an opposite direction, which demonstrates that side slip angle rate is changing through cornering, and indicates whether side slip angle rate is working against or together with track angle rate (path following).

Calculation of the track center is discussed in greater detail below. The same type of information of any point on the vehicle body may be determined based on the present calculation methods. A driver seating position may be used as a reference point to quantify a driver's feeling during cornering. Yaw center (YC) is a point on a vehicle body where lateral velocity is zero. Longitudinal velocity is the only velocity component at this point, and track center and instantaneous center of rotation are all on the same line, which vertically meets the longitudinal axis of the vehicle at the yaw center, as shown in FIG. 7.

As the vehicle moves, the yaw center migrates unless the vehicle is in a steady state cornering condition. The yaw center migration may demonstrate how the vehicle is developing cornering motion and how yaw center migration affects driver feeling. For example, a vehicle's rear axle is passive during steering of the vehicle, the vehicle's rear axle is passive, unless the vehicle is a four-wheel steering vehicle. With the passive rear axle, at the initiation of turning, the yaw center starts migrating from the rear axle and moves forward as turning progresses. Whereas, with the four-wheel steering vehicle, if the rear axle steers parallel to the front axle, then the yaw center starting point will be located behind the rear axle. If the rear axle steers opposite to the front axle, then the yaw center starting point will be in between the front and rear axles, depending on the ratio of front steer and rear steer.

Once information including the yaw center location, the side slip angle rate, the track angle rate and the yaw rate are measured, the track center (path center) and instantaneous center of rotation may be calculated as shown, for example, in FIG. 7. The longitudinal speed of the vehicle, track angle rate and yaw rate may be considered known. Additionally, both the track center and instantaneous center are known to be on the same line, which vertically intersects the vehicle longitudinal axis at the yaw center, and the distance to the track center and instantaneous center from the yaw center may be calculated.

Further, the track center location is reference point dependent. If the reference point is moved from the driver seating point to the CG or to other locations on the vehicle, then side slip angle rate and track angle rate will be changed, and a different track center location results. On the contrary, instantaneous center location is not affected by the reference point (or analysis point), and yaw rate is not dependent on the reference or analysis point. The instantaneous center may be used when vehicle motion is analyzed in a steady state cornering motion, where SSAR is zero at all vehicle points. Additionally, in the steady state cornering motion, TAR and YR are the same and TC and IC are at the same location. In other words, in the steady state, TC is IC. Since SSAR is zero at all vehicle points, in steady state analysis, the reference point need not be carefully selected. The relative location between the track center and instantaneous center is additional information about whether vehicle yaw motion around the yaw center is against or complying with path turning, as explained above.

The longitudinal velocity at the yaw center may be calculated either by multiplying yaw rate and distance from yaw center to instantaneous center or by multiplying track angle rate and distance from yaw center to track center. If the distance between track center and yaw center is greater than the distance between instantaneous center and yaw center, then a lower rotation rate results since the longitudinal velocity at yaw center is the same from both calculations.

Therefore, if the distance between track center and yaw center is less than the distance between instantaneous center and yaw center, then track angle rate is greater than the yaw rate. When the track angle rate is greater than the yaw rate, side slip angle rate is in an opposite turning direction, which may be characterized as side slip resistance, since side slip motion is not aiding in cornering. Conversely, if the track center is located farther than the instantaneous center, side slip angle rate is in the same turning direction, which may be characterized as side slip compliance, since side slip motion is aiding in cornering. Both yaw motions from rotation around yaw center and rotation from path turning are in the same direction. In other words, when side slip compliance occurs, side slip angle change complies with path turning.

Cornering at speed requires a high level of driver control. As the severity of cornering increases, the minimum level of control accuracy also increases. In routine handling, cornering control involves adjusting a vehicle path based on visual information by determining a relative position (deviation) of the vehicle to the particular road course. However, in limited handling or emergency handling, cornering requires controlling both path and yaw stability, which may require more than visual information of the vehicle deviation from the road course and may require more intensive feedback like vehicle trajectory (path), side slip, lateral velocity, lateral acceleration, steer torque feedback, and the like.

According to exemplary embodiments of the present disclosure, it is determined that, among the types of more intensive feedback, separation of yaw motion into the previously described two components (e.g., rotation around track center and rotation around yaw center) may be provided to more accurately control a vehicle turning path and yaw spin motion stability. The positive affect on vehicle control that results from separation of yaw motion into two components is consistent with a relationship between a driver's vision and improved vehicle control.

In driver training, vision is often emphasized to ensure vehicle control. For example, a driver may look farther down a given track to obtain more information about the global coordinates of the vehicle, which may provide more information about the moving path at local coordinates (of the vehicle body) with respect to global coordinates. Relatively long-range vision during driving may enhance a driver's sense of rotation around the yaw center. The correlation includes comparison of the results of the transient motion analysis and a driver's subjective feeling of path and yaw stability control.

Further, a carving feeling is a type of cornering feedback. When a vehicle is configured to provide a pure carving feeling, the carving feeling enhances a driver's confidence of path and spin control. The vehicle providing the pure carving feeling may have relatively higher grip and relatively more robustness against external disturbances. With the pure carving feeling, it is easier for the driver to realize a quasi-steady state condition in the middle of a corner. Considering that one of the goals of vehicle control in cornering includes determination of maximum speed steady state cornering conditions through a given course, the pure carving feeling may boost driver confidence of cornering and enhance controllability by allowing the driver to more rapidly determine the maximum speed steady state condition.

By way of comparison, in snow skiing, carving may be achieved by bending and tilting the skis, i.e., entire portions of each ski may be in a pure carving condition. However, in vehicle cornering, due to physical limitations including the rigid body of the vehicle, the type of pure carving feel achieved in snow skiing, i.e., carving feeling on the entire vehicle body, is difficult. Therefore, in some exemplary embodiments of the present disclosure, detection and identification of a location of a vehicle body in (or close to) a pure carving condition with minimum sideways (or lateral) motion in a given cornering condition may be performed. The location of the pure carving feeling is desirably as close to the driver seating position as possible to ensure the driver perceives the pure carving feeling. Additionally, if a duration of the pure or near-pure carving event (or condition) is extended through the cornering, overall carving feeling and overall driver enjoyment may be enhanced.

Figure 8B:
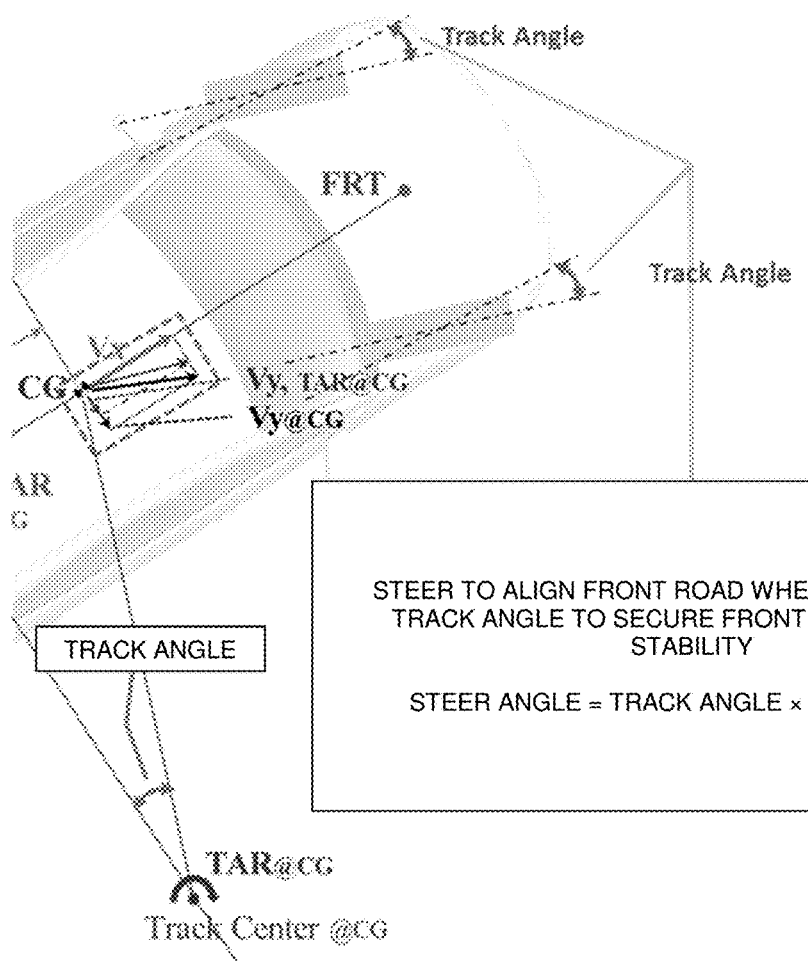
FIG. 8B is a zoomed-in view of an adjustment of an alignment of front axle wheels to the track angle from FIG. 8A according to an exemplary embodiment of the present disclosure.
Figure 8C:
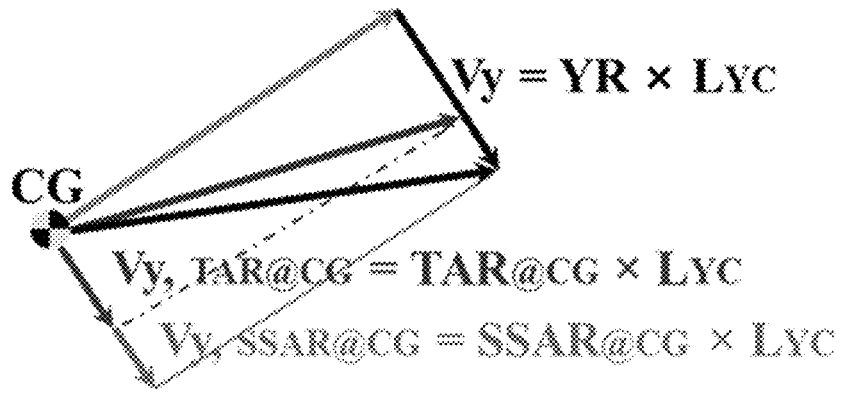
FIG. 8C and FIG. 8D are zoomed-in views of a lateral velocity decomposition and a track angle calculation from FIG. 8A, including a forward velocity, lateral velocity, TAR velocity and SSAR velocity at a center of gravity of the vehicle according to an exemplary embodiment of the present disclosure.
Figure 8D:
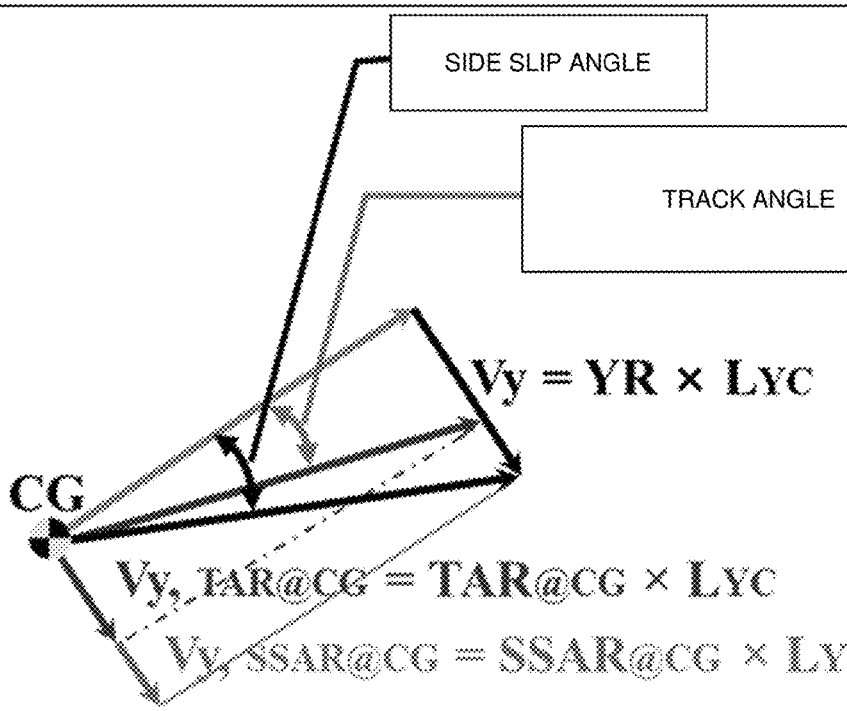

A detailed explanation of lateral velocity decomposition, track angle calculation, and front axle wheels steer to align to track angle is provided. FIG. 8A illustrates a vehicle motion control application of one or more of the analysis methods of the present disclosure to an emergency handling control situation, in which front wheels are aligned to a track angle to secure front axle lateral stability, according to an exemplary embodiment of the present disclosure. FIG. 8B is a zoomed-in view of an adjustment of an alignment of front axle wheels to the track angle from FIG. 8A according to an exemplary embodiment of the present disclosure. FIG. 8C and FIG. 8D are detailed views of a lateral velocity decomposition and a track angle calculation from FIG. 8A, including forward velocity (Vx), lateral velocity (Vy), TAR velocity ($Vy_{,TAR@CG}$) and SSAR velocity ($Vy_{,SSAR@CG}$) at a center of gravity (CG) of the vehicle according to an exemplary embodiment of the present disclosure.

In some exemplary embodiments, for improved steer control, moving direction of the vehicle is determined. Quantifying the vehicle moving direction may be an initial requirement for vehicle path and yaw stability control. However, in an emergency situation or a limited handling situation, which involve relatively higher side slip motion, a pure moving direction of vehicle is difficult to measure and calculate. In a high side slip (or high yaw spin) situation, to stabilize the vehicle, the vehicle may be steered towards a direction of motion, i.e., e.g., aligning front axle wheels toward a vehicle's actual moving direction.

If only a measured yaw rate and lateral velocity are used for steer control, then, in the emergency or limit handling situations, due to the higher than normal effect from side slip motion, the influence of the side slip angle rate is increased and it resulted in inaccurate estimation of moving direction. By incorporating yaw rate decomposition, lateral velocity may also be decomposed, and lateral velocity may be subtracted from the track angle rate portion, which may be used to determine the pure moving direction of the vehicle. FIGS. 8A-8D, inclusive, illustrate an exemplary embodiment of aligning the front axle wheels to the pure moving direction of the vehicle.

As described above, the effect of driver seating location on the driver's feeling of side slip angle, track angle and their rates of change are provided. Additionally, the yaw center location may affect driver's perception of carving feel and sideways motion. To improve the driver's feeling in cornering, in some exemplary embodiments, the driver seating location may be adjusted. Driver seating location may vary by vehicle type.

When the driver is seated relatively close to the rear axle, the driver may experience sideways O/S with more lateral motion. Accordingly, the driver may experience more aggressive cornering feeling with the additional sideways motion while the vehicle is heading into the corner. The relatively large lateral (or sideways) motion may degrade the carving feeling, but relatively large lateral motion may enhance a driver's perception of side slip angle and SSAR rate of change, which may enhance yaw motion control in a limit handling situation.

If the driver is seated relatively close to the front axle, the driver may experience sideways U/S. Once the yaw center moves in front of the driver, then the driver starts feeling sideways O/S. The sideways U/S and O/S may degrade a driver's perception of vehicle agility or cornering attack; however, sideways U/S and O/S may enhance the driver's perception of stability. The driver being seated relatively close to the front axle may result in the driver perceiving less sideways motion or lateral motion from the driver's seating position when the yaw center is located in front of the vehicle. When a relatively high side slip angle occurs at or near the limit of vehicle handling, in most situations, the yaw center is located in front of the vehicle. If the driver is seated relatively close to the yaw center, the driver may lose some perception of yaw spin, which may degrade yaw spin controllability.

As with the driver, yaw center migration and side slip angle rate may improve a passenger's perception of the vehicle in motion. For vehicles equipped with a second row or even a third row of seating, passengers seated in the second and third row are more likely to have the yaw center located in front of them during cornering. To minimize the effect of lateral motion from yaw spin on the passenger, yaw center migration may be performed at a relatively slower pace. Additionally, the vehicle may be configured to concentrate yaw center migration behind the driver seating location. Further, yaw spinning occurs relatively frequently and at a higher frequency for passengers, which may affect motion sickness. Accordingly, to minimize yaw spinning, the side slip angle rate portion of the yaw rate may be minimized. Unlike the driver, since passengers are not controlling the vehicle, increased exposure to sideways motion or lateral motion does not improve the passenger's perception of vehicle stability.

In some exemplary embodiments, cornering power of the rear tires may be increased. Additionally, the rear axle may be configured with increased kinematic settings and increased compliance U/S settings. With these settings, the rear axle side slip angle remains minimal, which may reduce yaw center migration and sideways (or lateral) motion in the rear axle The method of transient motion analysis includes at least five improvements: (1) yaw rate decomposition, (2) importance of time history information, (3) cornering feedback including carving feeling, (4) effect of driver seating location, and (5) calculation of a pure moving direction of a vehicle. In other words, the method of transient motion analysis may include yaw rate decomposition. The method of transient motion analysis may incorporate time history information.

The method of transient motion analysis may be applied to a system for vehicle control. For example, to improve motion control of a vehicle with relatively high side slip angle conditions, a calculation method for determining a pure moving direction of the vehicle is provided, which may be applied to improve steer control of the vehicle, for example, in an emergency situation. Additionally, in routine handling situations, yaw center migration may be considered a factor for cornering feeling since side slip angle rate is minimal. However, in limited handling or emergency handling situations, in addition to yaw center migration information, determination and use of information regarding side slip angle rate and track angle rate are provided to ensure objective analysis of cornering feedback.

Yaw rate decomposition is proposed and applied in transient motion analysis. Objective analysis of cornering feedback is presented with results of a correlation of three different vehicles. Quantification is primarily focused on data interpretation and analysis. The results provide objective data and may be used to predict performance of a vehicle in various driving conditions, including cornering. The results may also be applied to simulations or real-world implementations, particularly those where a prediction of a feeling or behavior of a driver (or a passenger) is desired.

Based on the present transient motion analysis method and correlation, an improved direct vehicle motion control method and system are proposed. Additionally, motion control guidelines are proposed to improve a subjective feeling of a driver and passenger in the vehicle. Calculation of a pure moving direction of a vehicle is applied to improve an active steer control method and system, which is particularly useful in emergency situations and which ensures improved yaw stability. Calculation of side slip angle rate may be applied to improve determination of a counter steer release point. Additionally, calculation of yaw center migration and side slip angle rate may be applied to improve the perception or feeling of the driver and passenger. As applied to an autonomous driving vehicle or a steer-by-wire (SBW)-implemented vehicle, steer control according to the present transient motion analysis method improves vehicle stability and path control.

Figure 9:
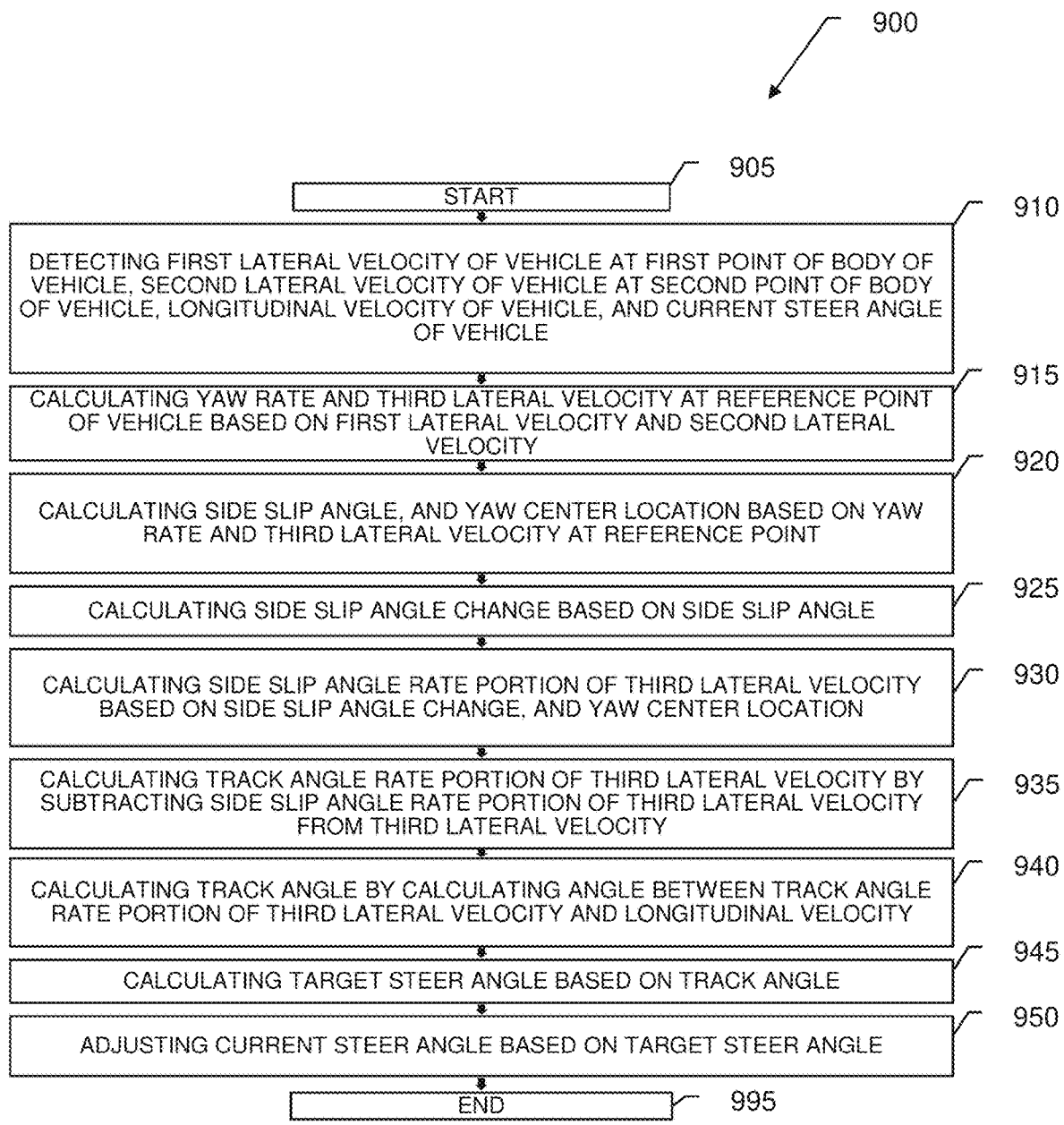
FIG. 9 is a process diagram illustrating a method of vehicle motion control according to an exemplary embodiment of the present disclosure.

FIG. 9 is a process diagram illustrating a method of vehicle motion control according to an exemplary embodiment of the present disclosure. A method 900 of steer control for a vehicle is provided. The method 900 may include a start 905. The method 900 may include detecting, by a processor, a first lateral velocity of the vehicle at a first point of a body of the vehicle, a second lateral velocity of the vehicle at a second point of the body of the vehicle, a longitudinal velocity of the vehicle, and a current steer angle of the vehicle 910.

Additionally, the method 900 may include calculating, by the processor, a yaw rate and a third lateral velocity at a reference point of the vehicle based on the first lateral velocity and the second lateral velocity 915. Alternatively, if a first point lateral velocity and yaw rate are directly measured, then the second, third or subsequent lateral velocity may be calculated based on the first point lateral velocity and the yaw rate. Further, the method 900 may include calculating, by the processor, a side slip angle, and a yaw center location based on the yaw rate and the third lateral velocity at the reference point 920. Alternatively, the side slip angle and yaw rate may be calculated based on (1) lateral velocities of any two or more known points, or (2) lateral velocity of a known point and the yaw rate. That is, a third point lateral velocity is not always necessary. That said, the third point lateral velocity may be important in that the third point may be a vehicle's CG or a seating position of a driver or passenger. Still further, the method 900 may include calculating, by the processor, a side slip angle change based on the side slip angle 925.

Additionally, the method 900 may include calculating, by the processor, a side slip angle rate portion of the third lateral velocity based on the side slip angle change, and the yaw center location 930. A track angle rate portion of the third lateral velocity may be calculated by subtracting the side slip angle rate portion of the third lateral velocity from the third lateral velocity 935. A point corresponding to the third lateral velocity may be any point on the vehicle. In some exemplary embodiments, the vehicle moving direction is of interest, and the CG point may be selected as the third point of reference. However, in other exemplary embodiments, a driver feeling may be of interest, in which case, a driver's seating position may be the third point of reference.

The side slip angle rate and the track angle rate of the third point are dependent on the location of the third point. If one were to change the location of the third point, the calculated side slip angle rate, track angle rate and TC location of the third point in a given moment of time would change even though all other parameters, such as yaw rate, first and second point lateral velocities, etc., are the same. In summary, the side slip angle rate, track angle rate and TC location may be dependent on a reference point location or a third reference point location. A track angle may then be determined by calculating an angle between the track angle rate portion of the third lateral velocity and the longitudinal velocity 940. Further, the method 900 may include calculating, by the processor, a target steer angle based on the track angle 945 and adjusting, by the processor, the current steer angle of the vehicle based on the target steer angle 950. The target steer angle may be measured with respect to a position of the steering wheel or a position of a front road wheel.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A method of steer control for a vehicle, comprising:
   detecting, by a processor using a sensor, a first lateral velocity of the vehicle at a first point of a vehicle body, a second lateral velocity of the vehicle at a second point of the vehicle body, a longitudinal velocity of the vehicle, and a current steer angle of the vehicle;
   calculating, by the processor, a yaw rate and a third lateral velocity at a reference point of the vehicle based on the first lateral velocity and the second lateral velocity, wherein the second lateral velocity is directly measured, or calculated based on the first lateral velocity and the yaw rate;
   calculating, by the processor, the third lateral velocity at the reference point, a side slip angle and a yaw center location based on the yaw rate and the lateral velocity of the first point or based on the lateral velocities of the first and second points;
   calculating, by the processor, a side slip angle change based on the side slip angle and calculating, by the processor, a side slip angle rate portion of the third lateral velocity based on the side slip angle change and the yaw center location or a distance from the reference point to a yaw center;

calculating, by the processor, a track angle rate portion of the third lateral velocity by subtracting the side slip angle rate portion of the third lateral velocity from the third lateral velocity;

calculating, by the processor, a track angle by calculating an angle between the track angle rate portion of the third lateral velocity and the longitudinal velocity;

calculating, by the processor, a target steer angle of the vehicle based on the track angle and a steer ratio of a steering wheel to a front road wheel to align the front road wheel parallel to a track angle velocity vector; and adjusting, by the processor, the current steer angle of the vehicle based on the target steer angle.

2. The method of claim 1, wherein the first point of the body of the vehicle is a first point along a centerline of the vehicle aligned with a front axle of the vehicle, and the second point of the body of the vehicle is a second point along the centerline of the vehicle aligned with a rear axle of the vehicle.

3. The method of claim 1, wherein a first dual axis optical sensor is mounted proximate to a front axle of the vehicle, and a second dual axis optical sensor is mounted proximate to a rear axle of the vehicle.

4. The method of claim 1, wherein the reference point is a center of gravity of the vehicle.

5. The method of claim 1, further comprising:
calculating, by the processor, that the side slip angle rate is equal to zero; and
operating, by the processor, a brake system of the vehicle to decelerate the vehicle in response to determining that the side slip angle rate is equal to zero.

6. A system for steering control of a vehicle, comprising:
a processor;
a first lateral velocity information of a first point of a body of the vehicle; and
a second lateral velocity information of a second point of the body of the vehicle or yaw rate information;
wherein the processor is configured to:
receive a first lateral velocity of the vehicle at a first point of a vehicle body, a second lateral velocity of the vehicle at a second point of the vehicle body, a longitudinal velocity of the vehicle from a longitudinal velocity sensor, and a current steer angle of the vehicle from a current steer angle sensor;
calculate a yaw rate based on the first lateral velocity and the second lateral velocity or measure the yaw rate by a yaw rate sensor;
calculate the third lateral velocity at the reference point, a side slip angle and a yaw center location based on the yaw rate and the lateral velocity of the first point or based on the lateral velocities of first and second points;
calculate a side slip angle change based on the side slip angle and calculating, by the processor, a side slip angle rate portion of the third lateral velocity based on the side slip angle change and the yaw center location or based on the distance from the reference point to a yaw center;
calculate a track angle rate portion of the third lateral velocity by subtracting the side slip angle rate portion of the third lateral velocity from the third lateral velocity;
calculate a track angle by calculating an angle between the track angle rate portion of the third lateral velocity and the longitudinal velocity;
calculate a target steer angle based on the track angle; and
adjust the current steer angle of the vehicle based on the target steer angle.

7. The system of claim 6, wherein the first point of the body of the vehicle is a first point along a centerline of the vehicle, and the second point of the body of the vehicle is a second point along the centerline of the vehicle.

8. The system of claim 6, wherein a first dual axis optical sensor is mounted proximate to a front axle of the vehicle, and a second dual axis optical sensor is mounted proximate to a rear axle of the vehicle.

9. The system of claim 6, wherein the reference point is a center of gravity of the vehicle.

10. The system of claim 6, wherein the processor is further configured to:
determine that the side slip angle rate is equal to zero; and
operate a brake system of the vehicle to control yaw stability of the vehicle in response to determining that the side slip angle rate is equal to zero.

* * * * *